(12) United States Patent
Komljenovic et al.

(10) Patent No.: US 12,313,881 B2
(45) Date of Patent: May 27, 2025

(54) HETEROGENOUSLY INTEGRATED SHORT WAVELENGTH PHOTONIC PLATFORM WITH OPTIMALLY MINIMAL REFLECTIONS

(71) Applicants: Tin Komljenovic, Goleta, CA (US); Minh Tran, Goleta, CA (US); Zeyu Zhang, Goleta, CA (US)

(72) Inventors: Tin Komljenovic, Goleta, CA (US); Minh Tran, Goleta, CA (US); Zeyu Zhang, Goleta, CA (US)

(73) Assignee: NEXUS PHOTONICS, INC, Goleta, CA (US)

( * ) Notice: Subject to any disclaimer, the term of this patent is extended or adjusted under 35 U.S.C. 154(b) by 401 days.

(21) Appl. No.: 18/071,239

(22) Filed: Nov. 29, 2022

(65) Prior Publication Data
US 2024/0176072 A1    May 30, 2024

(51) Int. Cl.
G02B 6/122    (2006.01)
(52) U.S. Cl.
CPC .................. G02B 6/1228 (2013.01)
(58) Field of Classification Search
None
See application file for complete search history.

(56) References Cited

U.S. PATENT DOCUMENTS

| | | | | |
|---|---|---|---|---|
| 6,083,843 A * | 7/2000 | Ohja | ........................ | G02B 6/30 438/723 |
| 8,368,995 B2 * | 2/2013 | Dallesasse | .............. | H01S 5/021 359/279 |
| 9,134,478 B2 * | 9/2015 | Park | ....................... | H01S 5/2031 |
| 9,360,644 B2 * | 6/2016 | Fasano | ............... | G02B 6/12004 |
| 9,568,676 B2 * | 2/2017 | Collins | ............... | G02B 6/4257 |
| 10,459,166 B2 * | 10/2019 | Collins | .............. | G02B 6/12002 |
| 10,585,351 B1 * | 3/2020 | Valentine | ................. | G02B 6/30 |

(Continued)

FOREIGN PATENT DOCUMENTS

EP    2985645 A1 *    2/2016    ......... G02B 6/12002

OTHER PUBLICATIONS

Consolidated EPO search and examinatoin report for related 23162508.8 EPO application (Year: 2023).*

*Primary Examiner* — Andrew Jordan
(74) *Attorney, Agent, or Firm* — Shalini Venkatesh

(57) ABSTRACT

A device has first, second and third elements fabricated on a common substrate. The first element supports a first optical mode in a first active waveguide, the second element supports a second optical mode in a second passive waveguide, and the third element, at least partly butt-coupled to the first element, has a bottom waveguide, supporting a bottom intermediate mode, overlying a top waveguide, supporting a top intermediate mode. A tapered waveguide structure in the top waveguide facilitates efficient adiabatic transformation between the top intermediate mode and the bottom intermediate mode. Tapering in at least one of the bottom waveguide and the second waveguide facilitates efficient adiabatic transformation between the second optical mode and the bottom intermediate optical mode. No adiabatic transformation occurs between either of the intermediate optical modes and the first optical mode. Lithographic alignment marks facilitate precise alignment of the three elements during device fabrication.

15 Claims, 10 Drawing Sheets

(56) References Cited

U.S. PATENT DOCUMENTS

| | | | | |
|---|---|---|---|---|
| 10,641,959 B1* | 5/2020 | Park | | G02B 6/1228 |
| 10,718,898 B1* | 7/2020 | Park | | G02B 6/1228 |
| 10,859,764 B2* | 12/2020 | Park | | G02B 6/1228 |
| 10,877,229 B2* | 12/2020 | Tummidi | | G02B 6/42 |
| 11,029,466 B2* | 6/2021 | Charles | | H01S 5/4031 |
| 11,209,592 B2* | 12/2021 | Zhang | | G02B 6/12004 |
| 11,287,573 B1* | 3/2022 | Zhang | | G02B 6/1228 |
| 11,480,734 B2* | 10/2022 | Park | | G02B 6/1228 |
| 11,662,523 B2* | 5/2023 | Bian | | G02B 6/305 385/49 |
| 11,719,883 B1* | 8/2023 | Zhang | | G02B 6/305 385/14 |
| 11,808,997 B1* | 11/2023 | Tran | | G02B 6/4215 |
| 11,906,773 B2* | 2/2024 | Park | | G02B 6/0023 |
| 11,971,577 B2* | 4/2024 | Tran | | H01S 5/1014 |
| 2014/0294341 A1* | 10/2014 | Hatori | | G02B 6/1228 385/14 |
| 2016/0047983 A1* | 2/2016 | Collins | | G02B 6/13 438/27 |
| 2018/0100970 A1* | 4/2018 | Park | | G02B 6/1228 |
| 2020/0166703 A1* | 5/2020 | Charles | | G02B 6/136 |
| 2020/0233149 A1* | 7/2020 | Park | | G02B 6/13 |
| 2020/0264391 A1* | 8/2020 | Tummidi | | G02B 6/424 |
| 2020/0284979 A1* | 9/2020 | Park | | G02B 6/12004 |
| 2021/0063627 A1* | 3/2021 | Park | | G02B 6/005 |
| 2021/0088727 A1* | 3/2021 | Park | | H01S 5/1064 |
| 2021/0373235 A1* | 12/2021 | Zhang | | G02B 6/1228 |
| 2022/0120970 A1* | 4/2022 | Zhang | | G02B 6/12004 |
| 2022/0190550 A1* | 6/2022 | Hjartarson | | H01S 5/1014 |
| 2023/0266532 A1* | 8/2023 | Zhang | | G02B 6/305 385/14 |
| 2023/0352908 A1* | 11/2023 | Komljenovic | | H01S 5/028 |
| 2023/0361534 A1* | 11/2023 | Zhang | | G02B 6/14 |
| 2023/0400634 A1* | 12/2023 | Tran | | H01S 5/1014 |
| 2023/0420916 A1* | 12/2023 | Zhang | | H01S 5/04257 |
| 2024/0159960 A1* | 5/2024 | Komljenovic | | H01S 5/02253 |
| 2024/0192441 A1* | 6/2024 | Komljenovic | | G02B 6/136 |
| 2024/0291239 A1* | 8/2024 | Komljenovic | | H01S 5/0215 |
| 2025/0035849 A1* | 1/2025 | Dorche | | G02F 1/0102 |

* cited by examiner

HETEROGENOUSLY INTEGRATED SHORT WAVELENGTH PHOTONIC PLATFORM WITH OPTIMALLY MINIMAL REFLECTIONS

FIELD OF THE INVENTION

The present invention relates to photonic integrated circuits. More specifically, certain embodiments of the invention relate to improved performance of heterogeneously integrated lasers and active components with waveguides operating at short wavelengths using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves. The material platform most commercially utilized for photonic integrated circuits is indium phosphide (InP), which allows for the integration of various optically active and passive functions on the same chip. Although many current PICs are realized in InP platforms, there has been significant research in the past decade in using silicon rather than InP for the realization of PICs, due to some superior characteristics as well as superior processing capabilities for the former material, that leverage the investment already made for electronic integrated circuits.

The biggest drawback in using silicon for PICs is that it is an indirect bandgap material which makes it hard to provide electrically pumped sources. This problem is generally solved by assembling PICs comprising two or more chips made from dissimilar materials in separate processes. Such an approach is challenging due to a need for very fine alignment, which increases packaging costs and introduces scaling limitations. Another approach to solving the bandgap problem is to bond two dissimilar materials and process them together, removing the need for precise alignment during the bonding of larger pieces or complete wafers of the dissimilar materials, and allowing for mass fabrication. In this disclosure, we use the term "hybrid" to describe the first approach that includes precise assembly of separately processed parts, and we use the term "heterogeneous" to describe the latter approach of bonding two materials and then processing the bonded result to define the waveguides and other components of interest.

To transfer the optical signal between dissimilar materials, the heterogeneous approach utilizes tapers whose dimensions are gradually reduced until the effective mode refractive indexes of dissimilar materials match and there is efficient power transfer. This approach generally works well when materials have small difference in refractive indexes as is the case with silicon and InP. In cases where there is larger difference in effective indexes, such as between e.g. SiN and GaAs or InP, the requirements on taper tip dimensions become prohibitive limiting efficient power transfer. Specifically, extremely small taper tip widths (of the order of tens of nanometers) may be necessary to provide good coupling. Achieving such dimensions is complex and may be cost prohibitive.

Although InP and silicon-based PICs address many current needs, they have some limitations; among them the fact that the operating wavelength range is limited by material absorption increasing the losses, and the fact that there is a limit on the maximum optical intensities and consequently optical powers that a PIC can handle. To address these limitations, alternate waveguide materials have been considered, such as SiN, SiNOx, LiNbO$_3$, TiO$_2$, Ta$_2$O$_5$, AlN or others. In general, such dielectric waveguides have higher bandgap energies which provides better high-power handling and transparency at shorter wavelength, but, in general such materials also have lower refractive indexes. E.g. SiN with bandgap of ~5 eV has refractive index of ~2, AlN has bandgap of ~6 eV and refractive index of around ~2, and SiO$_2$ with bandgap of ~8.9 eV has refractive index of ~1.44. For comparison, the refractive index of both InP and GaAs is >3. This makes the tapered approach challenging.

The alternative hybrid approach suffers from the drawbacks already mentioned above, namely the need for precise alignment, and correspondingly complex packaging and scaling limitations.

A recent approach to the problems discussed above was presented in U.S. Pat. No. 10,859,764 B2 employing butt-coupling in combination with a mode-converter to allow the heterogenous process to be used without the need for extremely small taper widths. Although providing good performance when operating at longer wavelengths (e.g. ~800 nm or more) for GaAs-based integrated actives and InP-based integrated actives), the efficiency of coupling decreases at shorter wavelengths where high-bandgap semiconductor materials are utilized or where laser layer stack thickness relative to wavelength of operation increases. In the former case, with high-bandgap semiconductor structures, contact layers might not be fully transparent at operating wavelength, or might have higher refractive indexes resulting with decrease of the active layer performance, either due to reduced confinement in the active region, increased internal loss or some other similar effect. A solution is to increase cladding thickness, but this reduces the coupling efficiency if approach outlined in U.S. Pat. No. 10,859,764 B2 is pursued.

In the latter case, the large total physical thickness of the laser structure relative to wavelength results in a bigger spatial offset (vertical in the orientation of FIG. 1) between the modes in two regions that need to be coupled, resulting in reduced coupling efficiency as will be described below.

The present invention is directed towards PICs employing butt-coupling and tapered waveguide structures to facilitate efficient coupling between active and passive waveguide structures to provide better performing active devices. In particular, embodiments described below are concerned with the detailed design of the optical coupling structure and waveguide design necessary for the creation of high-performance short wavelength (for example below 900 nm) lasers heterogeneously integrated with high-bandgap waveguides.

DETAILED DESCRIPTION

Described herein are embodiments of a platform for realization of photonic integrated circuits using wafer bonding and deposition of dissimilar materials where optical coupling is improved by use of mode conversion and a butt-coupling scheme. More specifically, certain embodiments of the invention relate to improved performance of heterogeneously integrated lasers and active components operating at short wavelengths with waveguides using dissimilar materials that are optically coupled.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Figure 3:
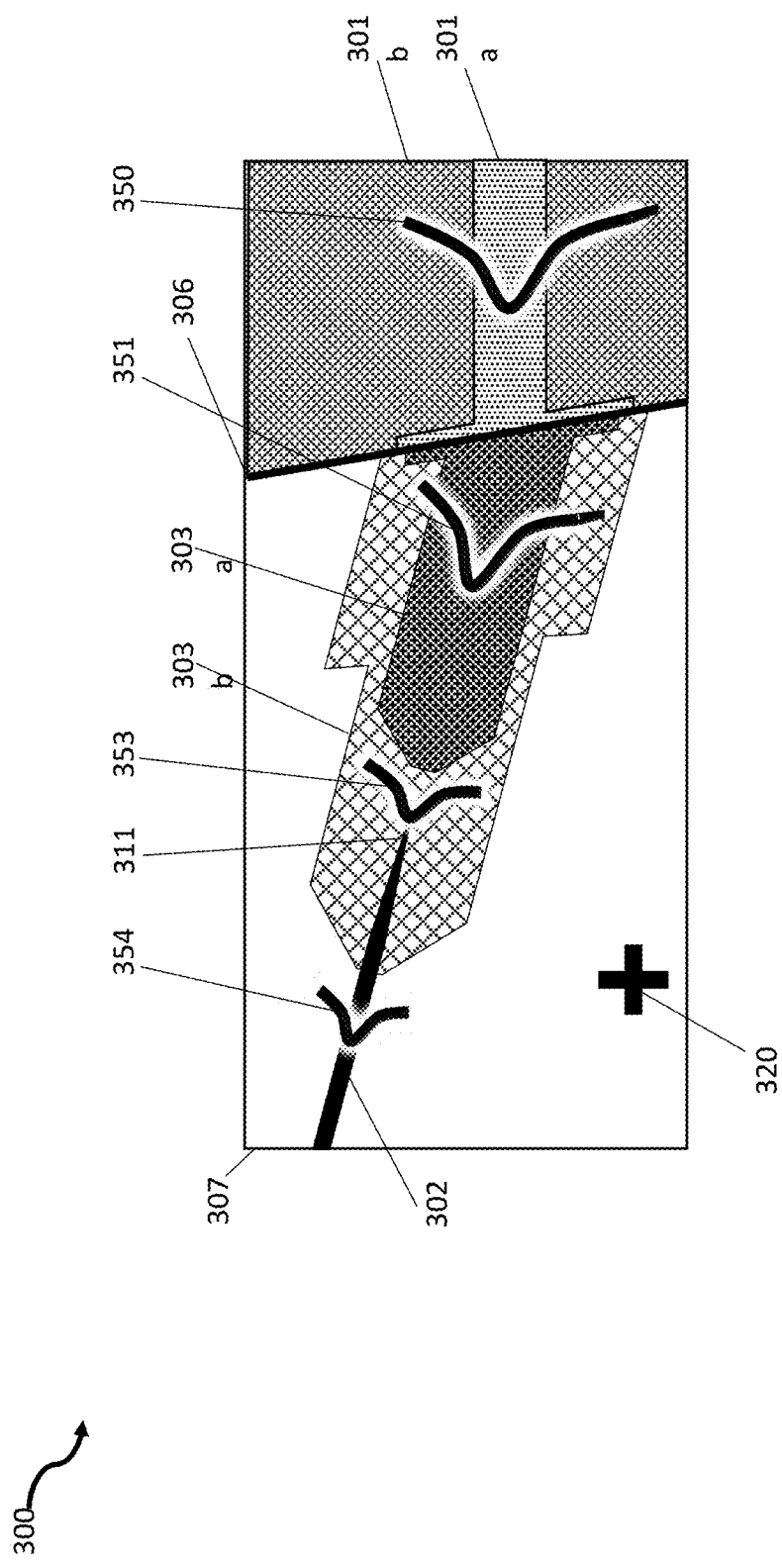
FIG. 3 shows a cross-sectional top-down view of a device according to some embodiments of the present invention.
Figure 7:
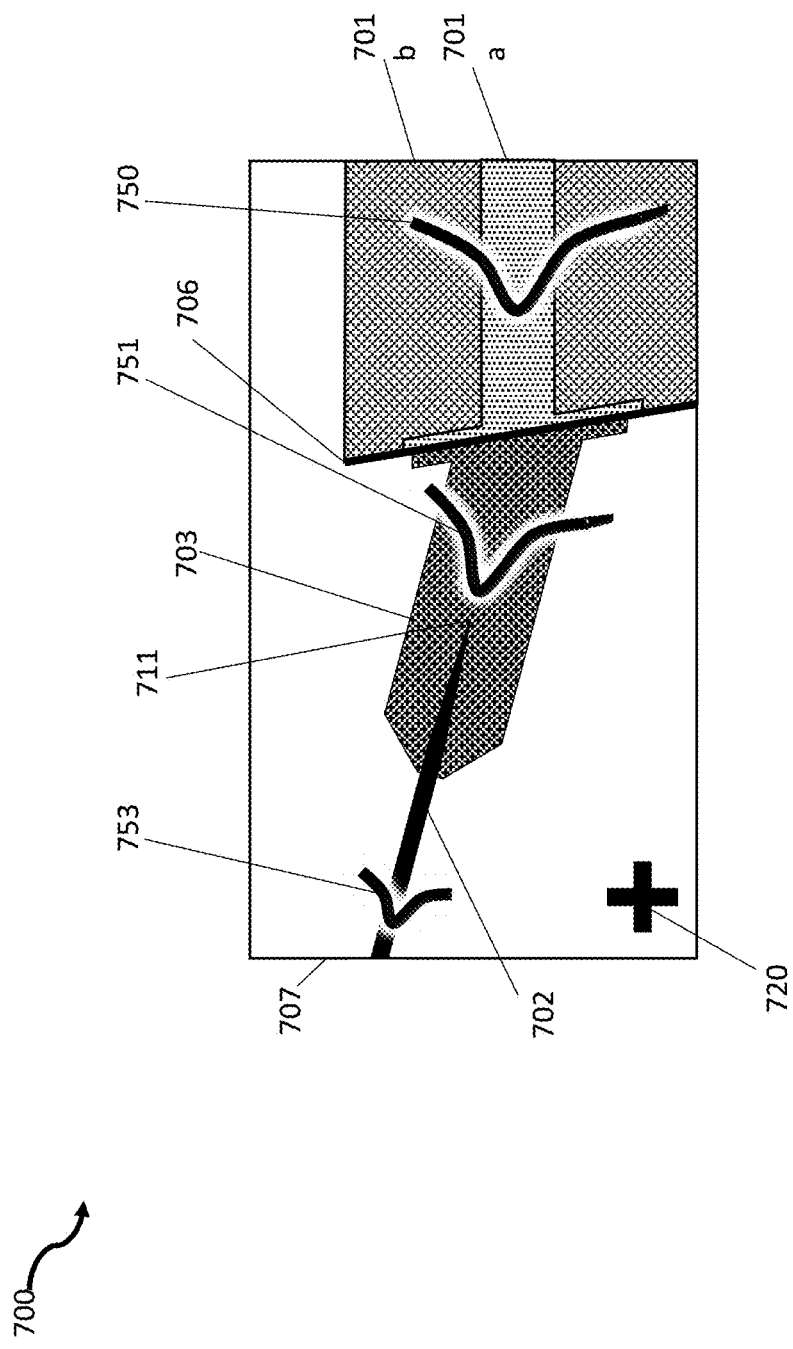
FIG. 7 shows a cross-sectional top-down view of a device according to some embodiments of the present invention.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as e.g. thin coating layer typically used to provide high-reflectivity or anti-reflectivity functionality. It should be noted that the axes of two waveguide structures or elements need not be colinear for them to be accurately described as being butt-coupled. In other words, the interface between the elements need not be perpendicular to either axis. FIGS. 3 and 7 embodiments discussed below are exemplary of such possibilities. No adiabatic transformation occurs between butt-coupled structures.

Term "active device", "active structure" or otherwise "active" element, part, component may be used herein. A device or a part of a device called active is capable of light generation, amplification, modulation and/or detection using electrical contacts. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, such as e.g. phase tuning implemented using thermal effects or similar that can provide modulation. No absolute distinction should be assumed between "active" and "passive" based purely on material composition or device structure. A silicon device, for example, may be considered active under certain conditions of modulation, or detection of low wavelength radiation, but passive in most other situations.

Figure 1:
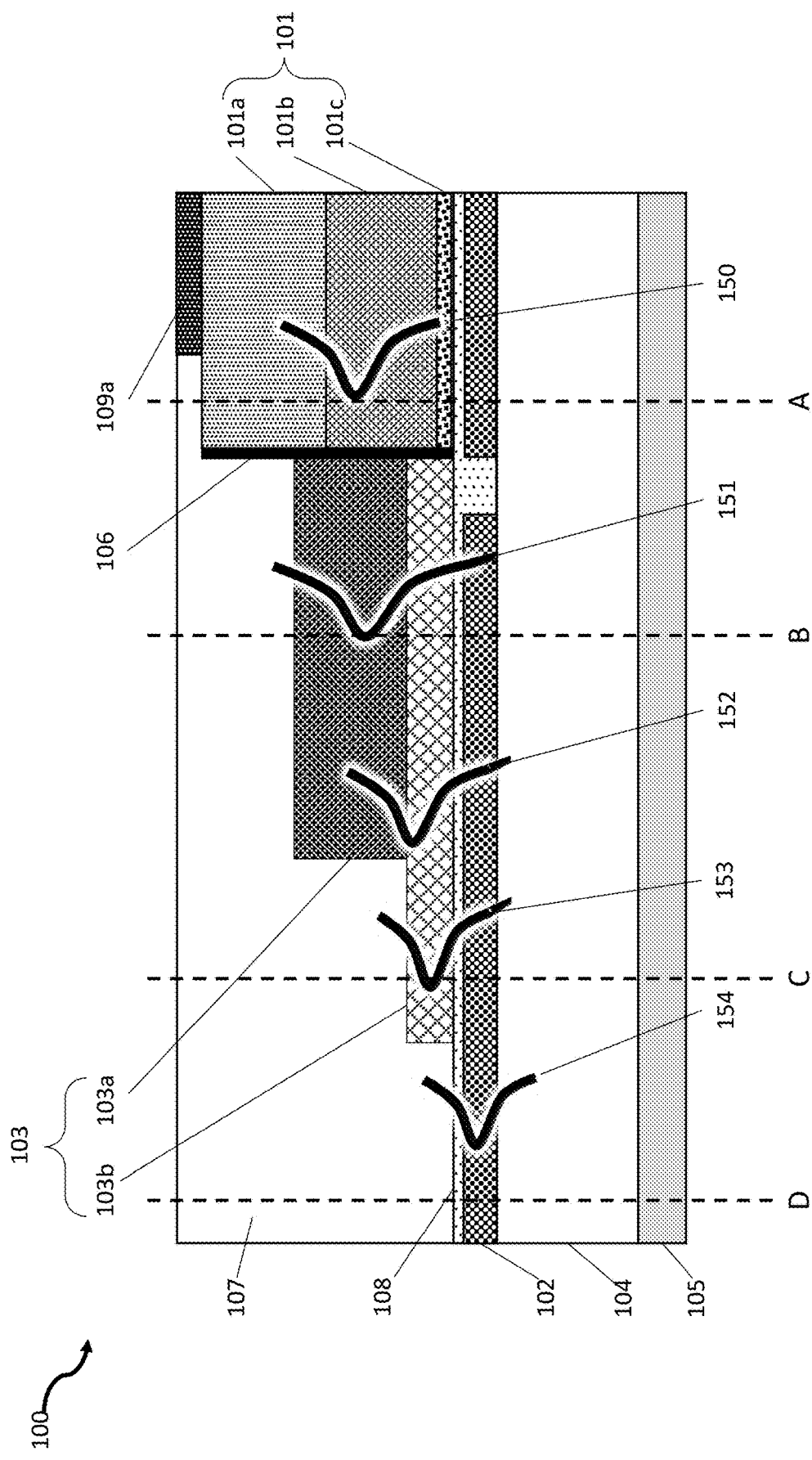
FIG. 1 illustrates a device according to one embodiment of the present invention, shown in cross section.

FIG. 1 is a schematic cross-section view of an integrated photonic device 100 utilizing butt-coupling and multi-stage mode conversion for efficient coupling between dissimilar materials. The exemplary cross-section includes a substrate 105 that can be any suitable substrate for semiconductor and dielectric processing, such as Si, InP, GaAs, quartz, sapphire, glass, GaN, silicon-on-insulator or other materials known in the art. In the shown embodiment, a layer of second material 104 is deposited, grown, transferred, bonded or otherwise attached to the top surface of substrate 105 using techniques known in the field. The main purpose of layer 104 is to provide optical cladding for material 102 (to be described below), if necessary to form an optical waveguide. Optical waveguides are commonly realized by placing higher refractive index core between two lower refractive index layers to confine the optical wave. In some embodiments, layer 104 is omitted and substrate 105 itself serves as a cladding.

Layer 102 is deposited, grown, transferred, bonded or otherwise attached to the top of layer 104 if present, and/or to the top of substrate 105, using techniques known in the field. The refractive index of layer 102 is higher than the refractive index of layer 104 if present, or, if layer 104 is not present, the refractive index of layer 102 is higher than the refractive index of substrate 105. In one embodiment, the material of layer 102 may include, but is not limited to, one or more of SiN, $SiNO_x$, $TiO_2$, $Ta_2O_5$, (doped) $SiO_2$, $LiNbO_3$ and AlN. In some embodiments, other common dielectric materials may be used for layer 102. In other embodiments, a high-bandgap semiconductor material may be used for layer 102. In some embodiments refractive index of layer 102 is between 1.44 and 2.5. Either or both of layers 104 and 102 can be patterned, etched, or redeposited to tailor their functionality (define waveguides, splitters, couplers, gratings and other passive components) as is common in the art.

Layer 108, whose refractive index is lower than the refractive index of layer 102, overlays layer 102 and underlays layers 101 and 103 (comprising sublayers 103a and 103b, to be described in more detail below). Layer 108 serves to planarize the patterned surface of layer 102. In some embodiments, the planarity of the top surface of layer 108 is provided by chemical mechanical polishing (CMP) or other etching, chemical and/or mechanical polishing methods. In other embodiments, the planarity is provided because of the intrinsic nature of the method by which layer 108 is deposited, for example if the material of layer 108 is a spin-on glass, polymer, photoresist or other suitable material. The planarization may be controlled to leave a layer of desired, typically very low, thickness on top of the layer 102 (as shown in FIG. 1), or to remove all material above the level of the top surface of the layer 102 (not shown). In cases where layer 108 is left on top of layer 102, the target thicknesses are in the range of 10 nm to several hundreds of nm, with actual thickness, due to planarization process non-uniformities, being between zero and several hundreds of nanometers larger than the target thickness. In some embodiments, spin-on material is used to planarize and is then etched back resulting with improved across wafer uniformity compared to typical CMP processes.

Layer 102 is a waveguide core layer of a waveguide in a passive waveguide structure that further includes layers 104, 107, and 108 in cases where those layers are present, and layer 105 in cases where layer 104 is not present.

Layer 101 is bonded on top of at least part of the corresponding (108, 102) top surface. The bonding can be direct molecular bonding, or additional materials can be used to facilitate bonding such as e.g. metal layers or polymer films as is known in the art. Layer 101 makes up what is commonly called an active device, or an active waveguide structure, and may be made up of materials including, but not limited to, GaAs and GaAs based ternary and quaternary materials, GaN and GaN based ternary and quaternary materials or any other material suitable for providing direct optical emission. Layer 101 in some embodiment is multilayered, comprising sublayers providing both optical and electrical confinement as well as electrical contacts, as is known in the art for active devices. In the embodiment shown in FIG. 1, layer 101 comprises three sublayers 101a, 101b and 101c as will be described in more detail with the help of FIG. 2. Sublayers of layer 101 in some embodiments provide vertical confinement (up/down in FIG. 1), while lateral confinement (surface normal to the cross-section shown in FIG. 1) is provided by at least one etch as is known in the art for active devices and will be described with the help of FIG. 2.

In some embodiments, layer 101 can be efficiently electrically pumped to generate optical emission and gain. In other embodiments, layer 101 can provide modulation and/or detection. The present invention enables efficient optical coupling between waveguides formed in layer 101 and layer 102. Said materials 102 can provide additional functionality such as wide-band transparency, high intensity handling, phase shifting by temperature, strain or other tuning mechanisms, combining, splitting, filtering, non-linear generation and/or others as is known in the art.

Efficient coupling is facilitated by layer 103, and, in cases where layer 106 is present, by layer 106. Optional layer 106 primarily serves as either an anti-reflective or a highly-reflective coating at the interface between layer 101 and layer 103. Layer 103 serves as an intermediate waveguide that in some embodiments accepts the profile (depicted by line 150) of an optical mode supported by the waveguide for which layer 101 provides the core, captures it efficiently as mode profile 151, and gradually transfers it to mode profiles 152, 153 and finally 154. Mode profile 154 is efficiency coupled to the waveguide for which layer 102 provides the core.

Layer 103 comprises two sublayers, top intermediate waveguide layer 103a and bottom intermediate layer 103b, whose refractive indexes and dimensions can be engineered to facilitate efficient butt-coupling of mode profile 150 and to efficiently transform the mode to one with mode profile 154 by taking advantage of tapered structures made in layer 102, sublayer 103b and/or sublayer 103a. In some embodiments, the refractive indexes of both of the sublayers 103a and 103b, comprising waveguides referred to as top and bottom intermediate waveguides respectively, are smaller than the refractive index of layer 102. In some embodiments the refractive indexes of sublayers 103a and 103b are between 1.44 and 2.2. In all embodiments, the refractive index of sublayer 103b is smaller than the refractive index of sublayer 103a. The thickness of layer 103 is an optimization parameter, and in some embodiments it is between 400 nm and 4000 nm, thickness largely being dependent on details of the layer 101 as will be described with the help of FIG. 2. Prior to the present invention i.e. in the absence of intermediate layer 103 with at least two sublayers 103a and 103b, the coupling efficiency would have been limited. The use of intermediate layer 103 with at least two sublayers 103a and 103b, however, significantly improves efficient transfer between very high refractive index materials supporting operating at short wavelength range (such as e.g. GaAs and/or GaN in layer 101) to low refractive index materials (such as e.g. SiN in layer 102).

Differences between the optical modes supported by waveguides in layers 101 and 102 respectively may or may not be obvious by observation of the mode profiles, but mode shape overlaps less than 100% along with non-zero vertical offsets (in FIG. 1, and as will be explained with the help of FIG. 2) between modes 150 and 154 could (in the absence of intermediate layer 103 with its sublayers 103a and 103b) result in significant optical loss. In some cases, losses of up to 2 dB may be considered acceptable, but losses greater than that might not be. In other cases, a 5 dB loss level may be the criterion chosen for acceptability. The function of layer 103 is to keep optical coupling losses due to imperfect mode overlap and vertical offset (between modes 150 and 154) below whatever is determined to be an acceptable level in a given application.

The upper cladding layer 107 for waveguides realized in 103 and/or 102 can be ambient air (meaning no cladding material is actually deposited) or can be any deliberately deposited suitable material as shown in FIG. 1, including, but not limited to, a polymer, $SiO_2$, SiN, $SiNO_x$ etc. In some embodiments, the same material is used for layer 107 and layer 108. In some embodiments (not shown), layer 107 cladding functionality can be provided with multiple depositions, e.g., one material provides the cladding for mode 154 guided by core formed in layer 102, another material provides the cladding for mode 153 guided by core formed in layer 103b, and/or yet another material provides the cladding for mode 151 guided by core formed in layer 103a. In all cases, the refractive index of the cladding material is lower than the refractive index of the material which provides the core for the mode guiding. In yet another embodiment (not shown here, but explained with the help of FIG. 2), at least one of the sublayers of layer 103 can provide cladding functionality to layer 102 and mode 154.

Layer 109a is a contact metal deposited on top of layer 101 as will be described in more detail with the help of FIG. 2. One or more lithography alignment marks (not shown in this cross-sectional view, but see, for example, 320 in FIG. 3, described below) are present to facilitate precise alignment between the layers formed during various processing steps.

Dashed lines A, B, C and D correspond to cross-sectional end-on views of a device according to some embodiments of the present invention described in more detail with the help of FIG. 2. In some embodiments, layer 108 is not present and both layers 101 and 103 are positioned on top of a patterned layer 102, 101 by bonding, and 103 by various deposition methods. In such embodiments, there is no planarization step.

Active waveguide structure 101 is one element (conveniently referred to as a first element) of three primary elements of device 100 shown in FIG. 1A, another (second) element being a passive waveguide structure (of which layer 102 is a core layer as noted above), and another (third) element being intermediate waveguide structure 103.

Figure 2A:
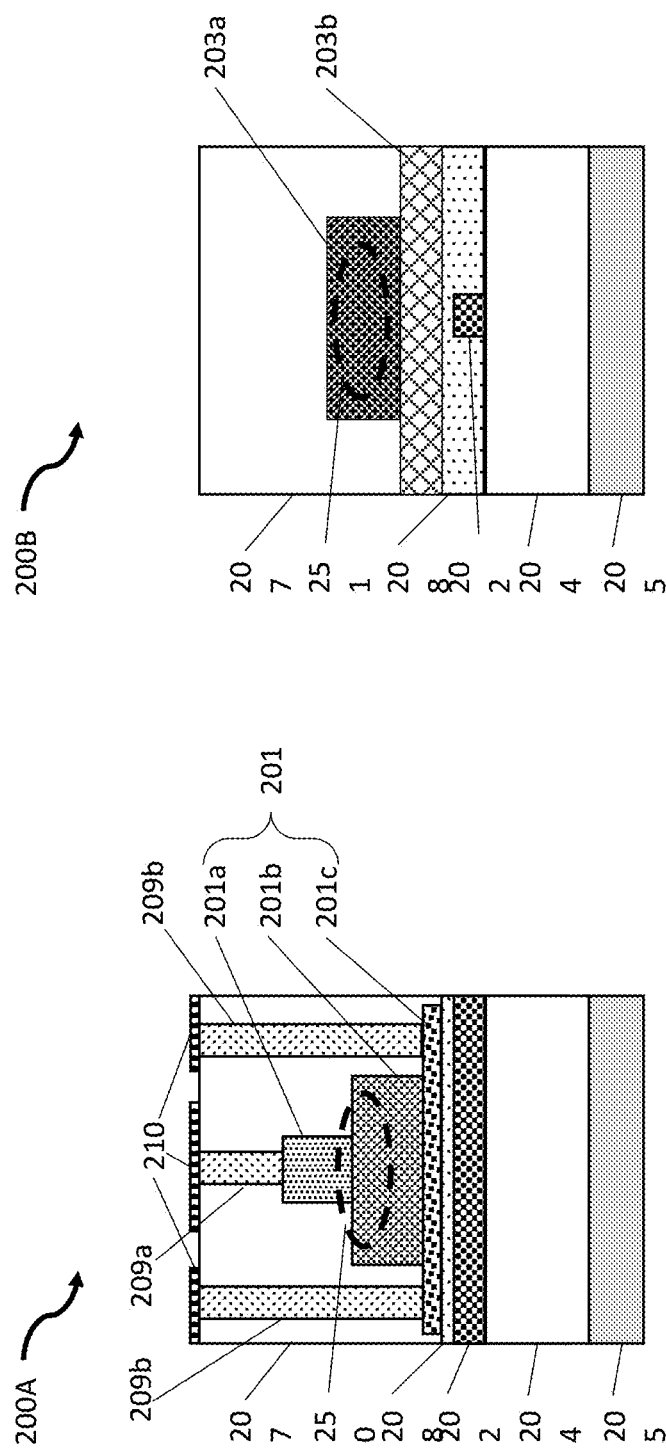
FIG. 2A shows cross-sectional end-on views of devices according to some embodiments of the present invention.
Figure 2B:
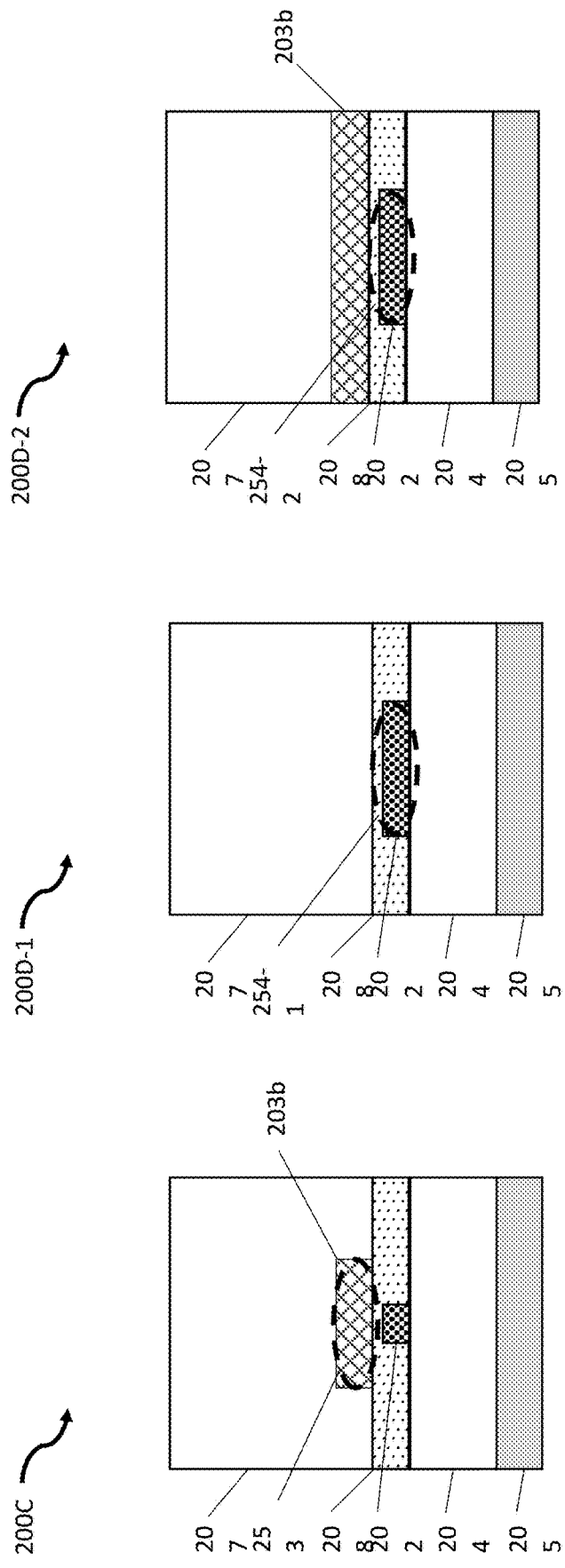
FIG. 2B shows additional cross-sectional end-on views of devices according to some embodiments of the present invention.

FIG. 2A and FIG. 2B collectively show five cross-sectional views 200A, 200B, 200C, 200D-1 and 200D-2 corresponding to four characteristic locations marked A, B, C, and D in FIG. 1, where views 200D-1 and 200D-2 correspond to two different embodiments of the same location D. View 200D-1 corresponds to the cross-section as related to the one shown in FIG. 1 at location D, while view 200D-2 would correspond to the cross-section at a similar location if layer 103b was not removed after the transition from mode 153 to mode 154 is complete. This is not explicitly shown in FIG. 1, but one skilled in the art should easily reconstruct the necessary cross-section utilizing the description in the remainder of the specification. Functional layers 201 to 209 (unless explicitly defined differently) correspond to functional layers 101 to 109 as described in relation to FIG. 1.

In FIG. 2A, cross-section 200A shows an exemplary cut through a region that comprises active layer 201 (corresponding to 101 in FIG. 1). Layer 201 comprises multiple sublayers providing the functionality necessary to realize active devices. In some embodiments, layer 201 comprises three sublayers 201a, 201b and 201c as shown in view 200A, where each of the sublayers can comprise additional sublayers with varying binary, ternary and quaternary compositions and various doping levels. In one embodiment (as shown in 200A), layer 208 is present beneath layer 201, providing a planarized surface for bonding. In another embodiment (not shown), layer 201 is on top of a combined top surface formed by layer 202 and layer 208 as planarization layer 208 was completely removed from the top surface of layer 202 but still is present in etched regions of layer 202 after deposition and planarization. In yet another embodiment (not shown), layer 201 is on top of layer 202 but without any planarization layer 208 filling in the etched regions of layer 202. In this embodiment there would be depressions or pockets where layer 202 was etched. In yet another embodiment (not shown), layer 201 is on top of layer 204 (if layer 202 is completely removed) and/or is on top of layer 205 (if layer 202 and 204 are completely removed).

Sublayer 201a in some embodiments comprises a first contact layer (either p-contact or n-contact) and corresponding cladding layer (p-cladding or n-cladding) with the optical mode being laterally confined by etch defining a mesa or ridge (horizontal left-right width in view 200A). The corresponding metal 209a (either p-metal or n-metal) is deposited on top of sublayer 201a which includes one or more contact sublayers and a cladding sublayer, the cladding sublayer serving to reduce internal loss by controlling the overlap between the optical mode 250 and metal 209a and between the optical mode 250 and those contact sublayers. Sublayer 201a can comprise additional layers such as bandgap smoothing layers, etch stop layers, graded layers, separate-confinement heterostructure (SCH) layers, etc. to provide improved performance or facilitate more robust fabrication as is known in the art of semiconductor device design and fabrication.

Sublayer 201b comprises the active region of the active device and a second cladding sublayer, below the active region (of opposite polarity (n or p) to that of the cladding sublayer of sublayer 201a). In some embodiments, the active region comprises quantum well, quantum dot, p-n junction and/or p-i-n junction layers with optional separate-confinement heterostructure (SCH) layer(s). The cladding sublayer of sublayer 201b serves to provide reduced internal loss by controlling the overlap between the optical mode and sublayer 201c (described below) if sublayer 201c comprises materials that are lossy at the wavelength of the operation of the device. In other embodiments, the thickness of cladding layer of sublayer 201b serves to control the mode confinement in the active region in cases where sublayer 201c comprises materials whose refractive indexes are comparable to or higher than the refractive indices of the core (active region) for the optical mode 250.

Sublayer 201b can comprise additional layers such as bandgap smoothing layers, etch-stop layers, graded layers, etc. to provide improved performance and facilitate more robust fabrication as is known in the art of semiconductor device design and fabrication. The width of sublayer 201b, as sketched in horizontal direction in cross-section 200A, is greater than the width of sublayer 201a. In other embodiments, the width of sublayers 201a and 201b can be substantially equal if they are defined with a single etch, or with multiple etches where target widths are nominally substantially equal. A general advantage of using two or more etches with different target widths for sublayer 201a and sublayer 201b (as sketched in view 200A) is the ability to reduce the interaction of the etched sidewall with the optical mode 250 and/or move away etched active region sidewall from the interaction with both the optical mode and injected/depleted carriers (resulting with sidewall recombination) through contacts 210 to be described below.

Sublayer 201c comprises a second contact layer (of opposite polarity (p or n) to that of the first contact layer in sublayer 201a) and optional superlattice layers to facilitate bonding and/or prevent dislocations. Sublayer 201c can comprise additional layers such as bandgap smoothing layers, etch-stop layers, graded layers, etc. to provide improved performance and facilitate more robust fabrication as is known in the art of semiconductor device design and fabrication. The width of sublayer 201c, as sketched in horizontal direction in cross-section 200A, is greater than the widths of sublayers 201a and 201b. Metal 209b is laterally offset either to one side or, as shown in the figure, both sides of the optical mode 250 (whose lateral confinement is defined by at least one etch). Layer 202 can be un-patterned below the optical mode (as shown in cross-section 200A) or can be patterned (not shown) to provide frequency-selective feedback to the optical mode 250 via evanescent field. This can be utilized to realize a distributed feedback (DFB) laser or similar devices.

Cladding 207 can comprise multiple materials, some of which might provide passivation functionality to the etched surfaces of layer 201 and its sublayers 201a, 201b, and 201c leading to improved laser performance. Both contact metals 209a and 209b are electrically connected to pad metal 210 serving to provide current and/or voltage control of the active device.

FIG. 2A includes cross-section 200B, which shows a region in which mode 250 in view 200A has been efficiently coupled to mode 251 supported by the waveguide whose core is defined in sublayer 203a. The transition between guided mode 250 supported in cross-section 200A and guided mode 251 supported in cross-section 200B utilizes butt-coupling as described with the help of FIG. 1, and as will be further described with the help of FIG. 3. In some embodiments, as shown in view 200B, the geometry of sublayer 203a is optimized to maximize the coupling efficiency between mode 250 and mode 251, by adjusting both the thickness and width of sublayer 203a, while vertical adjustment between centers of supported modes 250 and 251 is provided by an appropriate choice of the thickness of sublayer 203b. The ability to vertically adjust the height of sublayer 203a using sublayer 203b enables the thickness of sublayer 203a to be reduced, consequently reducing the number of supported modes in the waveguide for which sublayer 203a provide the core. This not only improves the coupling efficiency but also enables more robust performance in case there are fabrication imperfections such as deposition and etch thickness variations, as well as potential misalignment between subsequent lithography steps. The widths of sublayers 203b and 202 can be optimized and also gradually changed along the direction of propagation, together with the width of layer 203a, to facilitate more efficient coupling of modes 250 and 251. Note that there is no adiabatic transition between modes 250 and 251. In some embodiments, in at least part of the region where butt-coupling of modes 250 and 251 is facilitated, layer 202 is completely removed (not visible in view 200B, but one example is visible in FIG. 1, between dashed lines A and B).

In FIG. 2B, cross-section 200C shows a region in which mode 251 whose core is defined in sublayer 203a has been converted to mode 253 whose core is defined in sublayer 203b. The transition from 251 to 253 is gradual and utilizes waveguide width optimization and/or tapers in at least one of the sublayers 203a and 203b resulting in an adiabatic transformation, as shown in FIG. 1 where mode 151 transitions to mode 152 and finally mode 153.

Cross-section 200D-1 shows one embodiment of a region in which mode 253 whose core is defined in sublayer 203b is converted to mode 254-1 whose core is defined in sublayer 202. This transition is gradual and utilizes tapers in at least one of sublayer 203b and layer 202. The transformation utilizes adiabatic tapering between the two layers, with a dominant transition happening when there is phase matching between the mode dominantly residing in layer 202 and the mode dominantly residing in layer 203b. As this phase matching can be engineered to happen at relatively large waveguide widths, the need for very fine taper tips can be fully removed. In some cases, tapers as wide as e.g. 200 nm or wider can support efficient transmission enabling high fabrication yield even if standard lithography is utilized. In other cases, narrower tapers, e.g. with width approaching 100 nm, can be utilized which can also be fabricated using high-quality DUV lithography enabling high-throughput fabrication. In the embodiment shown in view 200D-1, sublayer 203b is completely removed once transition to mode 254-1 is complete and layers 207 and 208 serve as top/side cladding.

Cross-section 200D-2 shows another embodiment of the region in which mode 253 whose core is defined in sublayer 203b is converted to mode 254-2 whose core is defined in sublayer 202. This transition is gradual and utilizes tapers in at least one of the sublayer 203b and layer 202, but in contrast to the approach shown in 200D-1, here sublayer 203b is not removed after transition to mode 254-2 is complete. In this embodiment sublayer 203b is used as at least part of the cladding for the mode 254 in at least part of the device. This embodiment was not illustrated in FIG. 1 cross-section, but one skilled in the art should easily reconstruct the cross-section utilizing the description in the remainder of the specification.

FIG. 3 depicts a top-down view of an integrated photonic device 300 according to one embodiment of the present invention. Functional layers 301 to 307 (unless explicitly defined differently) correspond to functional layers 101 to 107 as described in relation to FIG. 1.

The optical mode 350 supported by active layer 301 (defined by at least one lateral etch defining the width of sublayer 301a) is guided across an interface between the active and intermediate portions of the device through optional coating layer 306 to sublayer 303a, which supports optical mode 351 and serves to convert the mode for efficient coupling to sublayer 303b, which in turn supports mode 353 and serves to convert the mode for efficient coupling to layer 302 which supports mode 354. Layer 306 can provide high-reflection functionality, or can facilitate reduced reflection when designed to function as an anti-reflection coating. To facilitate coupling between modes 350 and 354 that are vertically offset (as shown in FIG. 1), multiple transitions are utilized as described above.

The first transition, from mode 350 to 351, utilizes butt-coupling. In the embodiment shown in FIG. 3, two planar interfaces, the interface between layers 301 (comprising sublayers 301a, 301b and a third sublayer not visible in this view, but corresponding to 101c or 201c in FIGS. 1 and 2A), and 306, and the interface between 306 and 303 (comprising sublayers 303a and 303b) are not perpendicular to the propagation direction of mode 350, but are angled to reduce corresponding back reflections as is known in the art of butt-coupled interfaces. In some other embodiments, not shown, only one of those interfaces may be angled in this way. In yet other embodiments, not shown, both interfaces are simply perpendicular to the propagation direction of mode 350, to intentionally provide reflection, e.g. in the case of Fabry-Perot lasers or similar structures.

Once mode 350 has been efficiently captured by butt-coupling, and transformed into mode 351 which is supported by the core defined in layer 303a, at least one of the sublayers 303a and 303b is tapered to facilitate efficient mode transfer from mode 351 to 353.

Finally, mode 353 is efficiently transformed to mode 354 for which layer 302 provides the core. This transfer is facilitated by tapering the dimensions of at least one of the sublayer 303b and layer 202. In all cases, the requirements on the tip 311 of layer 302 are significantly relaxed as described above with regard to FIG. 2, so the complete coupling structure can be defined using standard lithography tools.

One or more lithography alignment marks 320 (only one is shown for simplicity) are used for precise alignment between various processing steps.

Figure 4:
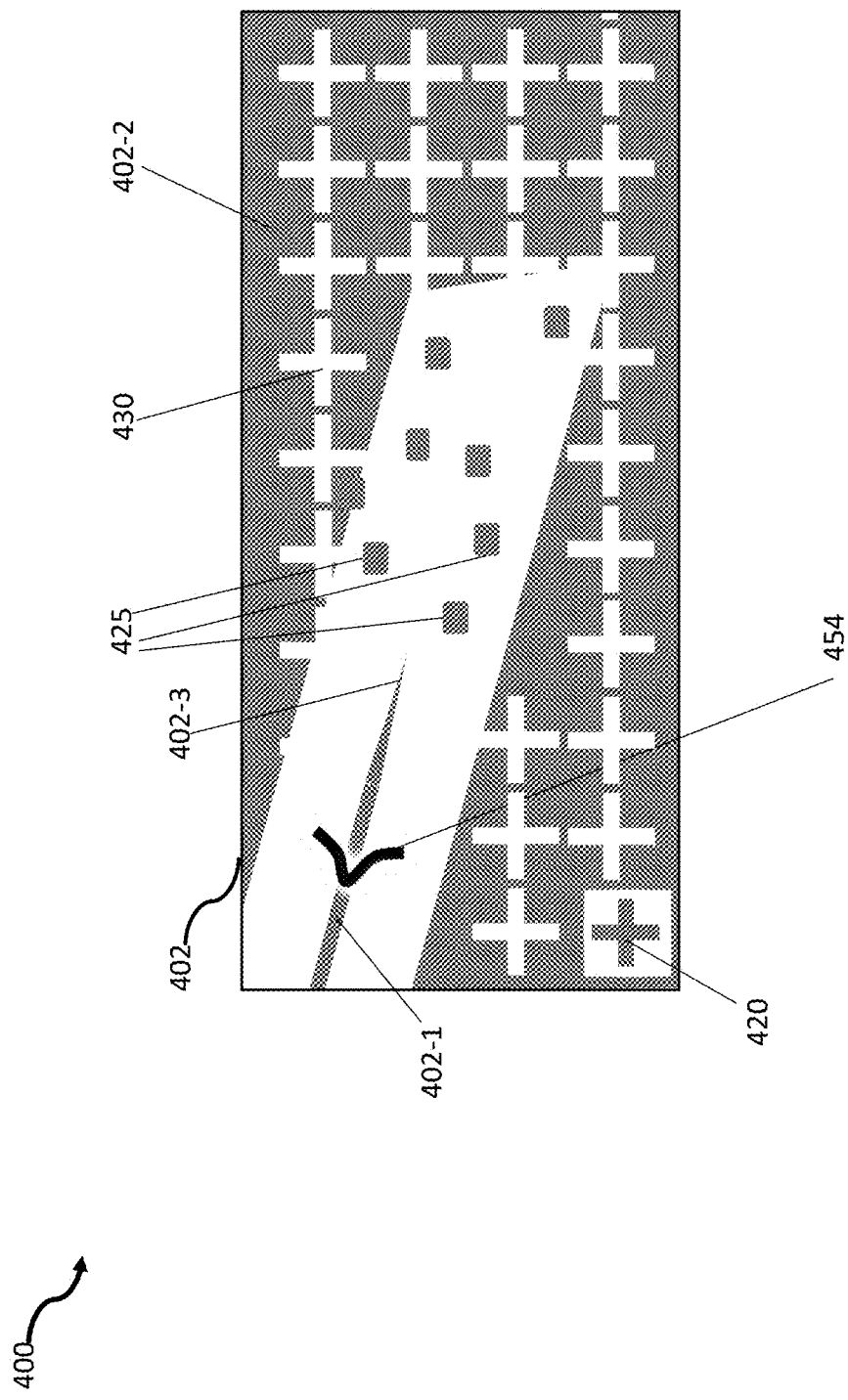
FIG. 4 shows a cross-sectional top-down view of a device according to some embodiments of the present invention.

FIG. 4 depicts a top-down view of a particular layer 402 (shown in shaded fill) of an integrated photonic device according to one embodiment of the present invention, either viewed directly at a fabrication stage prior to active element to passive element bonding, or in a horizontal cross-sectional slice through the finished device, where the particular layer corresponds to layer 102, 202 or 302 as described in relation to FIGS. 1, 2 and 3, but in this case includes 402-1, 402-2, 402-3, 420, 425, and 430 as described below. It is suitably patterned to support high-efficiency optical coupling as described above, but also to support efficient bonding of the active layers (e.g. layer 101 in FIG. 1). The particular layer after patterning comprises at least one waveguide 402-1 supporting mode 454 (corresponding to mode 354 as described with relation to FIG. 3), at least one tapered waveguide structure 402-3 used to facilitate efficient coupling as described above with the help of FIG. 1-3 and unetched regions 402-2 on top of which active layers can be bonded with or without planarization. To improve the process uniformity and facilitate higher quality bonding, layer 402 can comprise structures 430 serving to facilitate more efficient outgassing of by-products during the bonding process and/or increasing the uniformity of the etches. Structures 430 can be of various shapes and densities as optimized in a particular etch and/or bonding process. In some embodiments they can be shaped as crosses (as shown in FIG. 4), in other embodiments they can be rectangular or of any other suitable shape (or shapes) with optimized density. In some embodiments, channels formed within structures 430 may be filled and then re-etched after planarization to effectively act as air pockets into which outgassing by-products can be transported without impacting bonding yield. In yet other embodiments, the material used to fill structures 430 prior to planarization may provide sufficient outgassing capabilities. In such cases structures 430 are substantially filled in with such material, rather than being hollow. In some cases, there is a need to have larger etched regions as shown in the area after which waveguide 402-1 is terminated at the taper tip to support efficient coupling from top layers (as shown in FIGS. 1 and 2). Large etched areas might impact bonding quality and/or planarization quality. In some embodiments additional support structures 425 are introduced. Such structures can be of various shapes and densities. In some embodiments, they are intentionally placed on an irregular grid (as also shown in FIG. 4) which serves to provide mechanical support without resulting in a periodic distribution that could impact optical modes supported by other layers above (e.g. 103a, 103b and 101 as described in relation to FIG. 1) via the evanescent fields and generate higher levels of reflection or other unwanted feedback. In some embodiments, layer 402 also comprises alignment marks 420, one of which is shown in view 400.

In some other embodiments (not shown) layer 103 in FIG. 1, layer 203 in FIG. 2 and/layer 303 in FIG. 3 can comprise more than two sublayers, and a corresponding number of tapered waveguide structures. This can be useful if the optical mode in active region (101) is significantly displaced in vertical direction (up/down in FIG. 1) compared to the mode in passive region (102), and such multilayered structure can provide lower coupling losses between the two regions.

Figure 5:
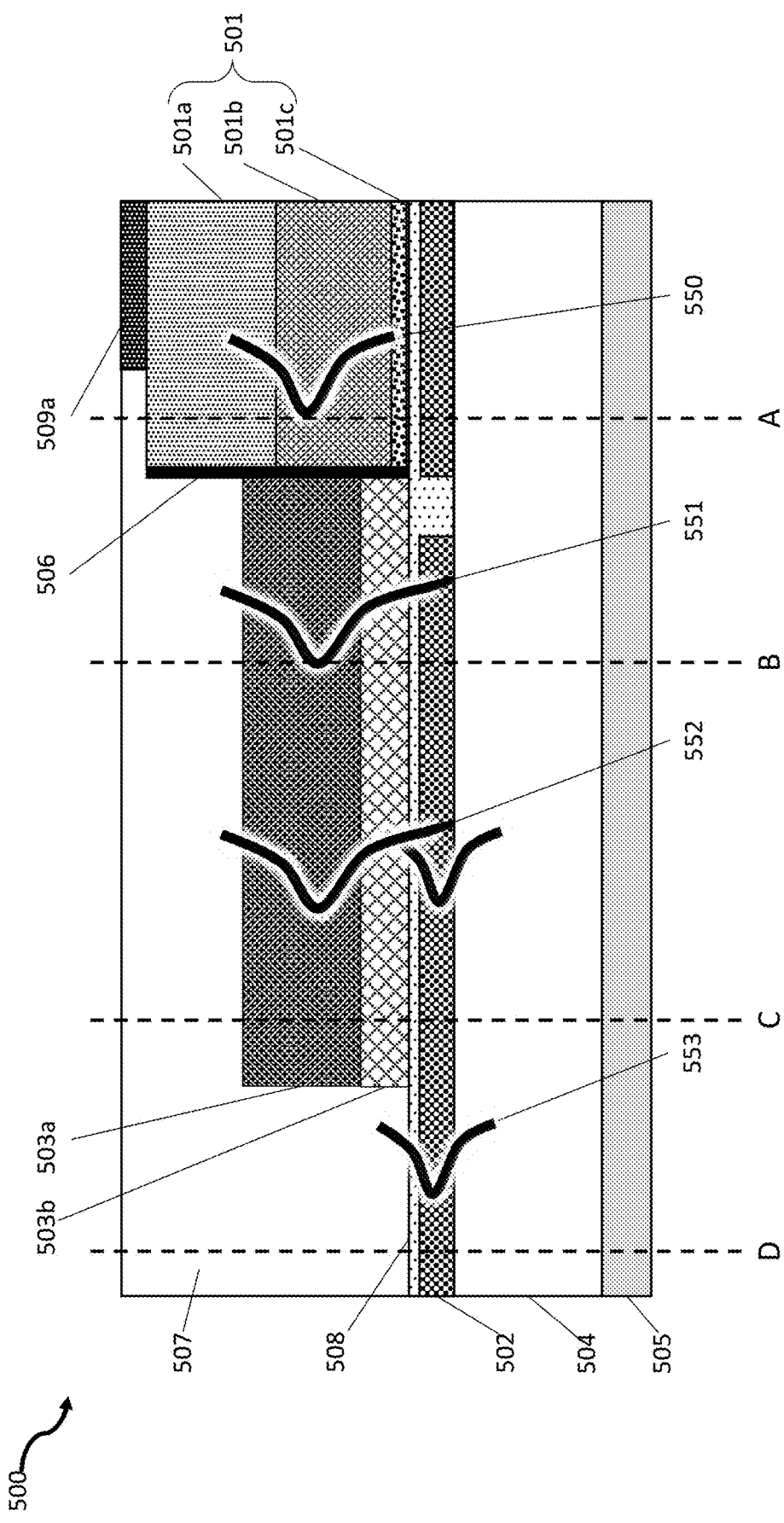
FIG. 5 illustrates a device according to one embodiment of the present invention, shown in cross section.

FIG. 5 is a schematic cross-section view of an integrated photonic device 500 utilizing butt-coupling and a multi-layer intermediately positioned structure (503) for efficient coupling between dissimilar materials. Functional layers 501 to 509 (unless explicitly defined differently below) correspond to functional layers 101 to 109 as described in relation to FIG. 1, with the key difference being the design of layer 503, and more specifically sublayers 503a and 503b, to facilitate efficient coupling using a single tapered structure in layer 503.

Efficient coupling between mode 550 supported by layer 501 and mode 553 supported by the waveguide whose core is defined in layer 502 is facilitated by layer 503, and, in cases where layer 506 is present, by layer 506. Optional layer 506 primarily serves as either an anti-reflective or a highly-reflective coating at the interface between layer 501 and layer 503. Layer 503 serves as an intermediate waveguide that in some embodiments accepts the profile (depicted by line 550) of an optical mode supported by the waveguide for which layer 501 provides the core, captures it efficiently as mode profile 551 using butt-coupling, and gradually transfers it to mode profile 552 which is a hybrid mode between waveguide cores 503a and 502 and finally to mode 553 which is efficiently guided by the waveguide for which layer 502 provides the core. The hybrid mode 552 can also be comprised of a superposition of a multiple modes as is common in the case of directional couplers.

Layer 503 comprises two sublayers 503a and 503b and their refractive indexes and dimensions can be engineered to facilitate efficient butt-coupling of mode profile 550 to mode profile 551, supported by a waveguide whose core is defined in sublayer 503a, and then to efficiently transform the corresponding mode to one with mode profile 553 by taking advantage of tapered waveguide structures made in layer 502 and sublayers 503b and 503a, as will be described with the help of FIG. 6. In some embodiments, the refractive indexes of both sublayers 503a and 503b are smaller than the refractive index of layer 502. In some embodiments the refractive indexes of sublayers 503a and 503b are between 1.44 and 2.2. In all embodiments, the refractive index of sublayer 503b is smaller than the refractive index of sublayer 503a. The thickness of layer 503 is an optimization parameter, and in some embodiments, it is between 400 nm and 4000 nm, its value largely being dependent on details of the layer 501 as will be described with the help of FIG. 6. Prior to the present invention i.e., in the absence of intermediate layer 503 with at least two sublayers 503a and 503b, the coupling efficiency would be limited in cases where the thickness of layer 501 and its sublayers defining the vertical extent of mode 550 is large compared to the wavelength of operation of the device. In such cases, a single layer 503 (with no sublayers) would provide reduced coupling efficiency due to the high number of modes that would be supported in layer 503. E.g., for a thickness of 1000 nm and an operational wavelength of 460 nm, layer 503 would support two or more vertical modes. However, in the present invention, where layer 503 includes at least two sublayers 503a and 503b, there is a significant improvement in efficient transfer, as sublayer 503a supports a smaller number of modes than it would if it had a total thickness equal to the sum of 503a and 503b.

Differences between the optical modes supported by waveguides in layers 501 and 502 respectively may or may not be obvious by observation of the mode profiles, but mode overlaps less than 100% along with non-zero vertical offsets (shown in FIG. 2, and as will be explained with the help of FIG. 6) between modes 550 and 553 could (in the absence of intermediate layer 503 with its sublayers 503a and 503b) result in significant optical loss. In some cases, losses of up to 2 dB may be considered acceptable, but losses greater than that might not be. In other cases, a 5 dB loss level may be the criterion chosen for acceptability. The function of layer 503 is to keep optical loss due to imperfect mode overlap and vertical offset (between 550 and 553) below whatever is determined to be an acceptable level in a given application.

The transition between mode 551 and mode 553 is facilitated by the detailed design of 502, 503a and 503b, which in combination may act as a vertical directional coupler, vertical adiabatic coupler and/or a vertical multi-mode interference coupler between waveguides whose cores are formed in layer 503a and 502. In the case of directional and/or adiabatic couplers, efficient transition is facilitated by optimizing the geometry to provide good phase matching, while in the case of a multi-mode interference coupler, the total structure length is optimized to provide the mode beat condition required to couple the light as desired, For convenience in this disclosure, light travel from right to left has been considered, with the desired output having mode profile 553, but of course bidirectional operation is supported by the same device structure, with a possible desired output being the mode with profile 550.

Figure 6A:
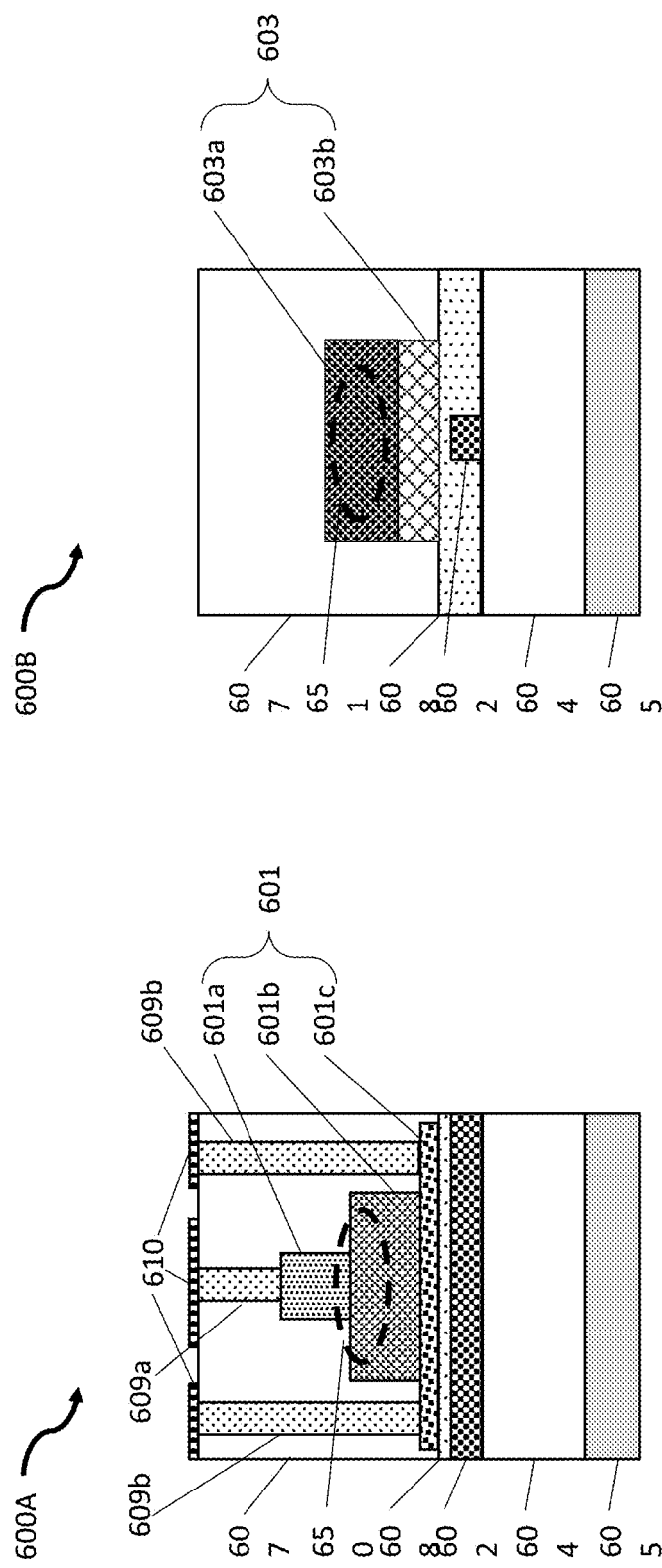
FIG. 6A shows two cross-sectional end-on views of devices according to some embodiments of the present invention.
Figure 6B:
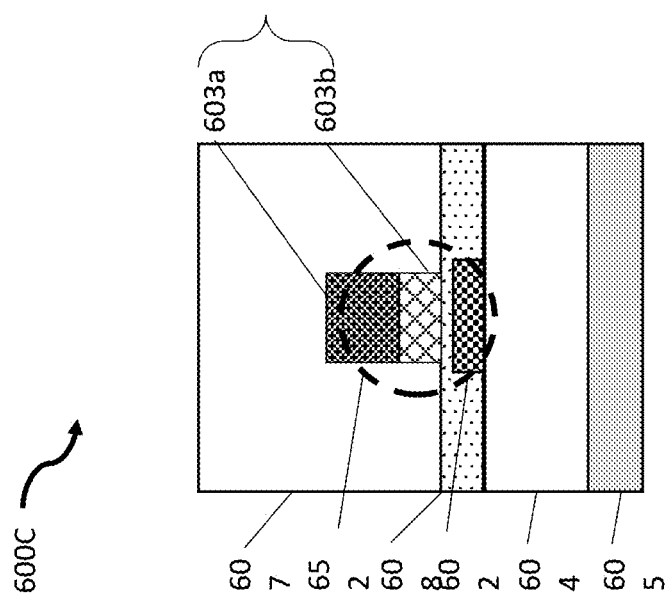
FIG. 6B shows an additional cross-sectional end-on view of devices according to some embodiments of the present invention.
Figure 6C:
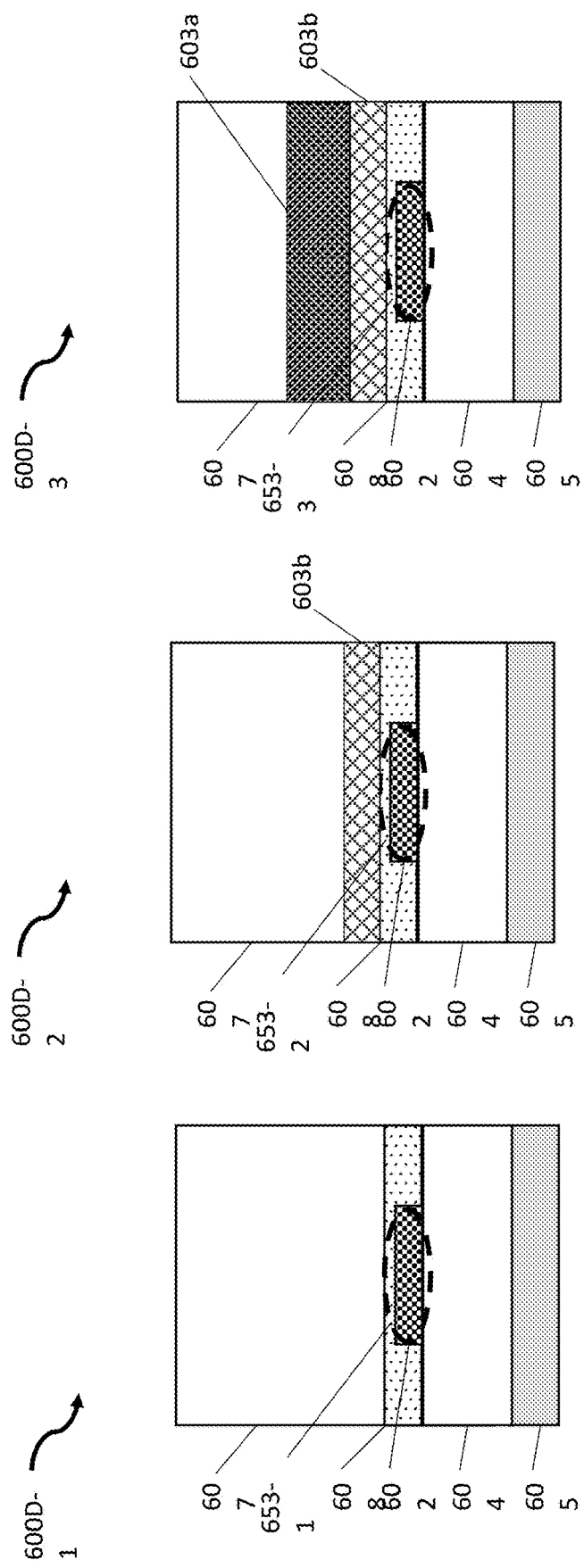
FIG. 6C shows three additional cross-sectional end-on views of devices according to some embodiments of the present invention

FIG. 6A, FIG. 6B and FIG. 6C collectively show six cross-sectional views 600A, 600B, 600C, 600D-1, 600D-2 and 600D-3 corresponding to four characteristic locations marked A, B, C, and D in FIG. 5, where views 600D-1, 600D-2 and 600D-3 correspond to three different embodiments of the same location D. View 600D-1 corresponds to the cross-section as related to the one shown in FIG. 5 at location D, while view 600D-2 and 600D-3 would correspond to the cross-section at similar location if layers 603b and/or 603a were not removed after the transition from mode 551 to mode 553 is complete. This is not explicitly shown in FIG. 5, but one skilled in the art should easily reconstruct the necessary cross-section utilizing the description in the remainder of the specification. Functional layers 601 to 609 (unless explicitly defined differently) correspond to functional layers 501 to 509 as described in relation to FIG. 5.

In FIG. 6A, cross-section 600A shows an exemplary cut through a region that comprises active layer 601 (corresponding to 501 in FIG. 5). View 600A is similar to view 200A as described in relation to FIG. 2.

Cross-section 600B shows a region in which mode 650 in view 600A has been efficiently coupled to mode 651 supported by the waveguide whose core is defined in sublayer 603a. The transition between guided mode 650 supported in cross-section 600A and guided mode 651 supported in cross-section 600B utilizes butt-coupling as described with the help of FIG. 5, and as will be further described with the help of FIG. 7. In some embodiments, as shown in view 600B, the geometry of sublayer 603a is optimized to maximize the coupling efficiency between mode 650 and mode 651. This is done by adjusting both the thickness and width of sublayer 603a, while vertical adjustment between centers of supported modes 650 and 651 is provided by an appropriate choice of thickness of sublayer 603b. The ability to vertically adjust the height of sublayer 603a using another sublayer 603b, enables the thickness of sublayer 603a to be reduced, consequently reducing the number of supported modes for which sublayer 603a provides the core of the waveguide. This not only improves the coupling efficiency but also enables more robust performance in case there are fabrication imperfections such as deposition and etch thickness variations, as well as potential misalignment between subsequent lithography steps. The widths of sublayers 603b and 602 can be optimized and also gradually changed along the length of propagation, together with the width of layer 603a, to facilitate more efficient coupling of modes 650 and 651. Note that there is no adiabatic transition between modes 650 and 651. In some embodiments, in at least part of the region where butt-coupling of modes 650 and 651 is facilitated, layer 602 is completely removed (not visible in view 600B, but one example is visible in FIG. 5 between dashed lines A and B).

In FIG. 6B, cross-section 600C shows a region in which mode 651 whose core is defined in sublayer 603a is in the process of being converted to mode 653 (shown in three variations of view 600D-1, 600D-2 and 600D-3) whose core is defined in layer 602. In view 600C, the current mode is illustrated as mode 652 that in part resides inside the layer 603a, in part in layer 603b and in part inside the layer 602. The transition from 651 to 653 is gradual and utilizes waveguide width optimization and/or tapers in at least one of layer 603 and layer 602. This transition is facilitated by designing a vertical directional coupler, vertical adiabatic coupler and/or vertical multi-mode interference coupler between waveguides whose cores are formed in layer 603a and 602, where layer 603b serves as cladding or spacer during the transition.

In FIG. 6C, cross-section 600D-1 shows one embodiment of the region in which mode 651 whose core is defined in sublayer 603a is converted to mode 653-1 whose core is defined in sublayer 602. The transformation can be achieved with a directional coupler, one or more adiabatic tapers, or an MMI coupling arrangement between the two layers, with a dominant transition happening when there is phase matching between the mode dominantly residing in layer 602 and the mode dominantly residing in layer 603a. As this phase matching can be engineered to happen at larger waveguide widths, the need for very fine taper tips can be fully removed. In some cases, tapers as wide as e.g., 200 nm or wider can support efficient transmission enabling high fabrication yield even if standard lithography is utilized. In other cases, narrower tapers, e.g., with widths approaching 100 nm, can be utilized which can also be fabricated using high-quality DUV lithography enabling high-throughput fabrication. In embodiments where transformation utilizes a vertical multi-mode interference coupler the dimensions of such a structure are also larger than the typical limitation of modern lithography. In the embodiment shown in view 600D-1, both sublayers 603a and 603b are completely absent where the transition to mode 653-1 is complete, and layers 607 and 608 serve as top/side cladding.

Cross-section 600D-2 shows another embodiment of the region in which mode 651 whose core is defined in sublayer 603a is converted to mode 653-2 whose core is defined in sublayer 602. In contrast to the approach shown in 600D-1, here sublayer 603a is not present after the transition but sublayer 603b is and is used as at least part of the cladding for the mode 653-2. This embodiment was not illustrated in FIG. 5 cross-section, but one skilled in the art should easily reconstruct the cross-section utilizing the description in the remainder of the specification.

Cross-section 600D-3 shows another embodiment of the region in which mode 651 whose core is defined in sublayer 603a is converted to mode 653-3 whose core is defined in sublayer 602. In contrast to the approach shown in 600D-1 and 600D-2, here both sublayers 603a and 603b are present even after the transition region and are used as at least part of the cladding for the mode 653-3. This embodiment was not illustrated in FIG. 5 cross-section, but one skilled in the art should easily reconstruct the cross-section utilizing the description in the remainder of the specification.

FIG. 7 depicts a top-down view of an integrated photonic device 700 according to one embodiment of the present invention. Functional layers 701 to 707 (unless explicitly defined differently) correspond to functional layers 501 to 507 as described in relation to FIG. 5.

The optical mode 750 supported by active layer 701 (defined by at least one lateral etch defining the width of sublayer 701a) is guided across an interface between the active and intermediate portions of the device through optional coating layer 706 to layer 703, which supports optical mode 751 and serves to convert the mode for efficient coupling to layer 702, which supports mode 753. Layer 706 can provide high-reflection functionality, or can facilitate reduced reflection when designed to function as an anti-reflection coating. To facilitate coupling between modes 750 and 753 that are vertically offset (as shown in FIG. 5), sublayers in layer 703 are utilized as explained above in relation to FIGS. 5 and 6.

The first transition, from mode 750 to 751, utilizes butt-coupling. In the embodiment shown in FIG. 7, two planar interfaces, the interface between layers 701 (comprising sublayers 701a, 701b and a third sublayer not visible in this view but corresponding to 601c in FIG. 6A), and 706, and the interface between 706 and 703 (comprising sublayers 703a and 703b) are not perpendicular to the propagation direction of mode 750 but are angled to reduce corresponding back reflections as is known in the art of butt-coupled interfaces. In some other embodiments, not shown, only one of those interfaces may be angled in this way. In yet other embodiments, not shown, both interfaces are simply perpendicular to the propagation direction of mode 750, to intentionally provide reflection, e.g. in the case of Fabry-Perot lasers or similar structures.

Once mode 750 has been efficiently captured utilizing butt-coupling and transformed into mode 751 which is supported by the core defined in layer 703a, at least one of the sublayer 703a, sublayer 703b and layer 702 is tapered to facilitate efficient mode transfer from mode 751 to 753. In all cases, the requirements on the dimensions of tip 711 of layer 702 are significantly relaxed as described above with the help of FIG. 6, so complete coupling structure can be defined using standard lithography tools.

One or more lithography alignment marks 720 (only one is shown for simplicity) are used for precise alignment between various processing steps.

It is to be understood that these illustrative embodiments teach just some examples of heterogeneously integrated lasers and active components operating at short wavelengths utilizing the present invention, and many other, similar arrangements can be envisioned. Furthermore, such lasers and active components can be combined with multiple other components to provide additional functionality or better performance such as various filtering elements, amplifiers, monitor photodiodes, modulators and/or other photonic components.

Embodiments of the present invention offer many benefits. The integration platform enables scalable manufacturing of PICs made from multiple materials providing higher-performance and/or ability to operate in broadband wavelength range. Furthermore, the platform is capable of handling high optical power compared to typical Si waveguide-based or InP waveguide-based PICs.

This present invention utilizes a process flow consisting typically of wafer-bonding of a piece of compound semiconductor material on a carrier wafer with dielectric waveguides (as is described with the help of FIG. 1) and subsequent semiconductor fabrication processes as is known in the art. It enables an accurate definition of optical alignment between active and passive waveguides typically via a lithography step, removing the need for precise physical alignment. Said lithography-based alignment allows for scalable manufacturing using wafer scale techniques.

It is to be understood that optical coupling between modes in active and passive layers is reciprocal, so that, taking FIG. 1 as exemplary, the structure can be configured to facilitate light transmission from region 101 to region 102, but it could also facilitate transmission in the reverse direction, from region 102 to region 101. It is to be understood that multiple such transitions with no limitation in their number or orientation can be realized on a suitably configured PIC.

Other approaches have relied on die attachment of pre-fabricated optical active devices to passive waveguides. This requires very stringent alignment accuracy which is typically beyond what a typical die-bonder can provide. This aspect limits the throughput of this process as well as the performance of optical coupling.

In some embodiments the active device can utilize the substrate for more efficient thermal sinking, due to direct contact to the substrate with no dielectric in-between.

In some embodiments, the active device creates a hybrid waveguide structure with dielectric layers which can be used, for example, to create a wavelength selective component formed inside the laser cavity for e.g. distributed feedback (DFB) lasers or similar components.

Embodiments of the optical devices described herein may be incorporated into various other devices and systems including, but not limited to, various computing and/or consumer electronic devices/appliances, communication systems, medical devices, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
first, second and third elements fabricated on a common substrate;
wherein the first element comprises an active waveguide structure supporting a first optical mode the second element comprises a passive waveguide structure supporting a second optical mode and the third element, at least partly butt-coupled to the first element, comprises a bottom intermediate waveguide structure overlying the second element and a top intermediate waveguide structure overlying the bottom intermediate waveguide structure;
wherein the bottom intermediate waveguide structure supports at least one bottom intermediate mode in a bottom waveguide, and the top intermediate waveguide structure supports at least one top intermediate mode in a top waveguide;
wherein a tapered waveguide structure in the top intermediate waveguide of the third element facilitates efficient adiabatic transformation between one of the top intermediate modes in the top intermediate waveguide and one of the bottom intermediate modes in the bottom intermediate waveguide;
wherein one or more tapered waveguide structures in at least one of the bottom intermediate waveguide of the third element and the second element facilitates efficient adiabatic transformation between the second optical mode and one of the intermediate optical modes of the third element bottom intermediate waveguide;
wherein an interface between the first and third elements is angled at a value optimized to minimize reflections;
wherein no adiabatic transformation occurs between any of the intermediate optical modes and the first optical mode; and
wherein mutual alignments of the first, second and third elements are defined using lithographic alignment marks that facilitate precise alignment between layers formed during processing steps of fabricating the first, second and third elements.

2. The device of claim 1, wherein the third element is deposited onto a planarized top surface overlying the substrate.

3. The device of claim 1, wherein the bottom waveguide in the third element serves as cladding, in at least part of the device, in the second element.

4. The device of claim 1, wherein the second element comprises at least one of an outgassing channel and a support structure.

5. The device of claim 4, wherein the second element comprises a plurality of support structures, arranged in a non-periodic pattern to reduce frequency selective feedback.

6. The device of claim 1, wherein the top intermediate waveguide of the third element is characterized by a refractive index larger than a refractive index characterizing the bottom intermediate waveguide of the third element.

7. The device of claim 6, wherein each of the top intermediate waveguide of the third element and the bottom intermediate waveguide of the third element is characterized by a refractive index less than 2.

8. A device comprising:
first, second and third elements fabricated on a common substrate;
wherein the first element comprises an active waveguide structure supporting a first optical mode, the second element comprises a passive waveguide structure supporting a second optical mode, and the third element, at least partly butt-coupled to the first element, comprises an intermediate waveguide structure comprising a top sublayer overlying a bottom sublayer overlying the second element, the top sublayer comprising a core of an intermediate waveguide supporting at least one intermediate mode;
wherein a tapered waveguide structure in at least one of the intermediate waveguide structure and the passive waveguide structure facilitates efficient adiabatic transformation between one of the intermediate optical modes and the second optical mode;
wherein an interface between the first and third elements is angled at a value optimized to minimize reflections;
wherein no adiabatic transformation occurs between any of the intermediate optical modes and the first optical mode; and
wherein mutual alignments of the first, second and third elements are defined using lithographic alignment marks that facilitate precise alignment between layers formed during processing steps of fabricating the first, second and third elements.

9. The device of claim 8, wherein the third element is deposited onto a planarized top surface overlying the substrate.

10. The device of claim 8, wherein the bottom sublayer in the third element serves as cladding, in at least part of the device, in the second element.

11. The device of claim 8, wherein the top and bottom sublayers in the third element serve as cladding, in at least part of the device, in the second element.

12. The device of claim 8, wherein the second element comprises at least one of an outgassing channel and a support structure.

13. The device of claim 8, wherein the second element comprises a plurality of support structures, arranged in a non-periodic pattern to reduce frequency selective feedback.

14. The device of claim 8, wherein the top sublayer of the third element is characterized by a larger refractive index than a refractive index characterizing the bottom sublayer of the third element.

15. The device of claim 8, wherein each of the top waveguide of the third element and the bottom waveguide of the third element is characterized by a refractive index less than 2.

* * * * *